United States Patent
March Nomen et al.

(10) Patent No.: US 10,511,156 B2
(45) Date of Patent: Dec. 17, 2019

(54) LIGHTNING CURRENT TRANSMISSION SYSTEM FOR WIND TURBINES

(71) Applicant: GAMESA INNOVATION & TECHNOLOGY, S. L., Sarriguren (Navarra) (ES)

(72) Inventors: Victor March Nomen, Sarriguren (ES); Miguel Linares Fano, Sarriguren (ES); Francisco Javier Ostiz Zubiri, Sarriguren (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 0 days.

(21) Appl. No.: 15/715,843

(22) Filed: Sep. 26, 2017

(65) Prior Publication Data

US 2018/0097347 A1    Apr. 5, 2018

(30) Foreign Application Priority Data

Oct. 5, 2016    (ES) .................................. 201600821

(51) Int. Cl.
  *H02G 13/00*    (2006.01)
  *F03D 80/30*    (2016.01)

(52) U.S. Cl.
  CPC ............. *H02G 13/40* (2013.01); *F03D 80/30* (2016.05); *F05B 2220/706* (2013.01); *F05B 2240/21* (2013.01)

(58) Field of Classification Search
  CPC ... H02G 13/40; F03D 80/30; F05B 2220/706; F05B 2240/21; Y02E 10/721; Y02E 10/725; Y02E 10/726
  USPC ....................................................... 416/146 R
  See application file for complete search history.

(56) References Cited

U.S. PATENT DOCUMENTS

| | | | |
|---|---|---|---|
| 2010/0188790 A1* | 7/2010 | Llorente Gonzalez | F03D 1/065 361/117 |
| 2013/0100570 A1* | 4/2013 | Lyngby | H02H 7/24 361/117 |
| 2016/0281687 A1* | 9/2016 | Sogaard | F03D 80/30 |
| 2017/0268486 A1* | 9/2017 | Muller | F03D 7/0224 |

FOREIGN PATENT DOCUMENTS

| EP | 1 930 586 A1 | 6/2008 |
|---|---|---|
| ES | 2 265 776 B1 | 2/2008 |

* cited by examiner

*Primary Examiner* — Joseph J Dallo
*Assistant Examiner* — Yi-Kai Wang
(74) *Attorney, Agent, or Firm* — Ladas & Parry LLP

(57) ABSTRACT

A lightning current transmission system in a wind turbine between a metal band located at the root of each blade and a metal ring located at the nacelle through a lightning current transmission element comprising a conductive portion, an insulating portion and a supporting unit to be joined to the rotor hub. The metal band and the metal ring are configured with protruding parts extended towards the lightning current transmission element. The conductive portion of the lightning current transmission element comprises first and second receptors mounted on a base plate at different heights and oriented in a direction pointing, respectively, to the protruding parts of the metal band and the metal ring.

12 Claims, 4 Drawing Sheets

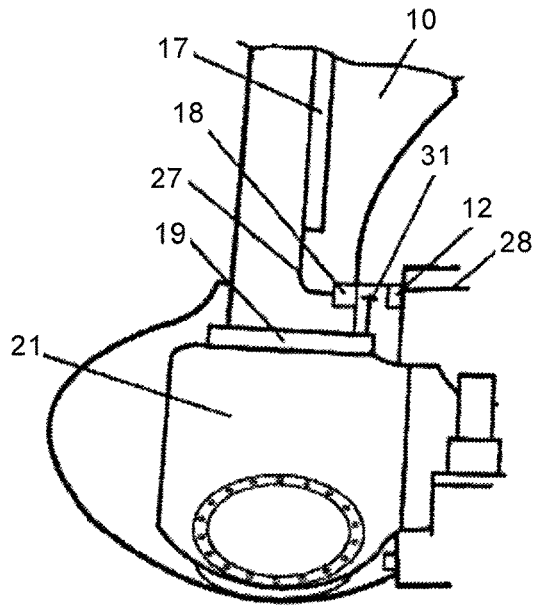
FIG. 2
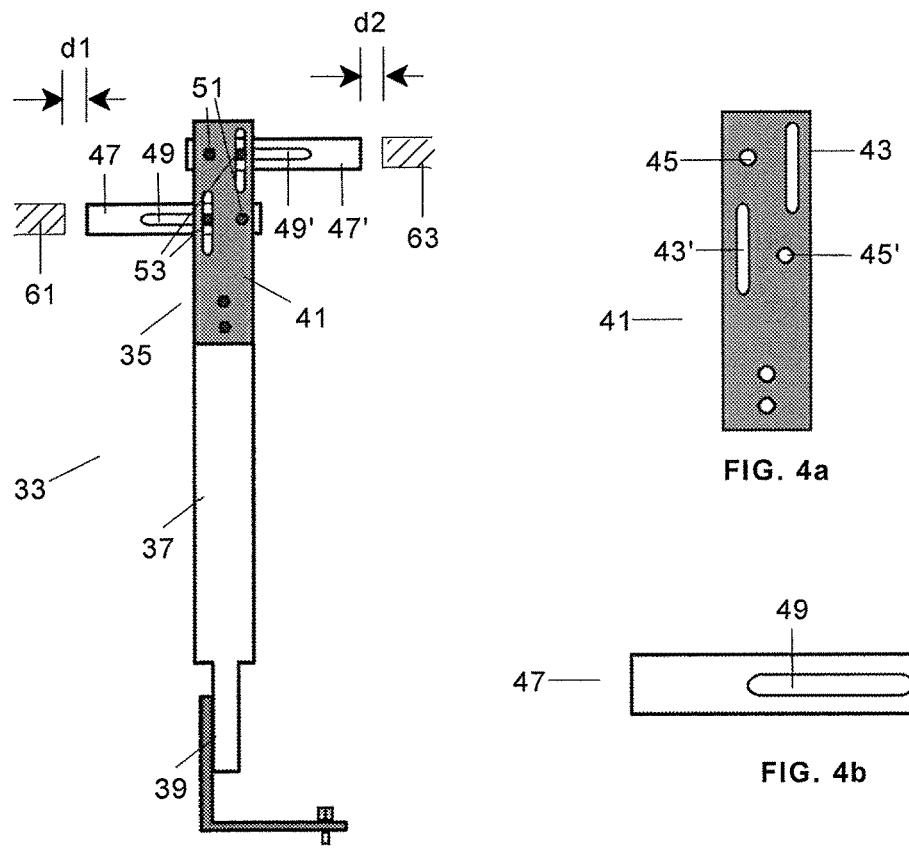
FIG. 3
FIG. 4a
FIG. 4b

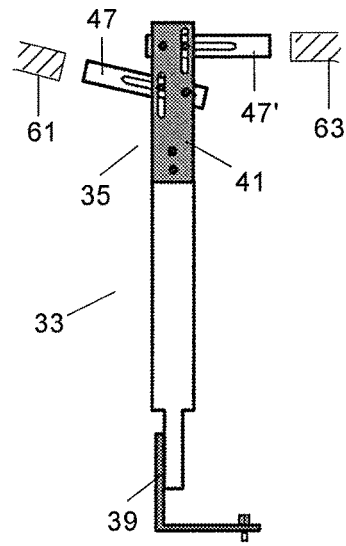
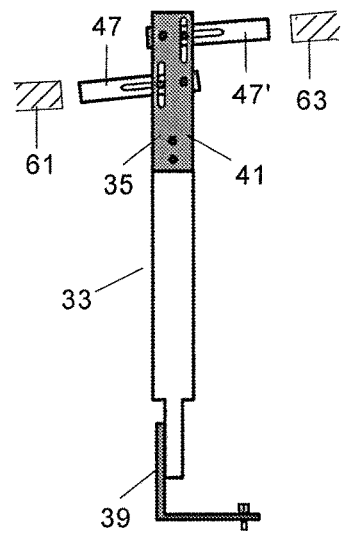
FIG. 5a  FIG. 5b
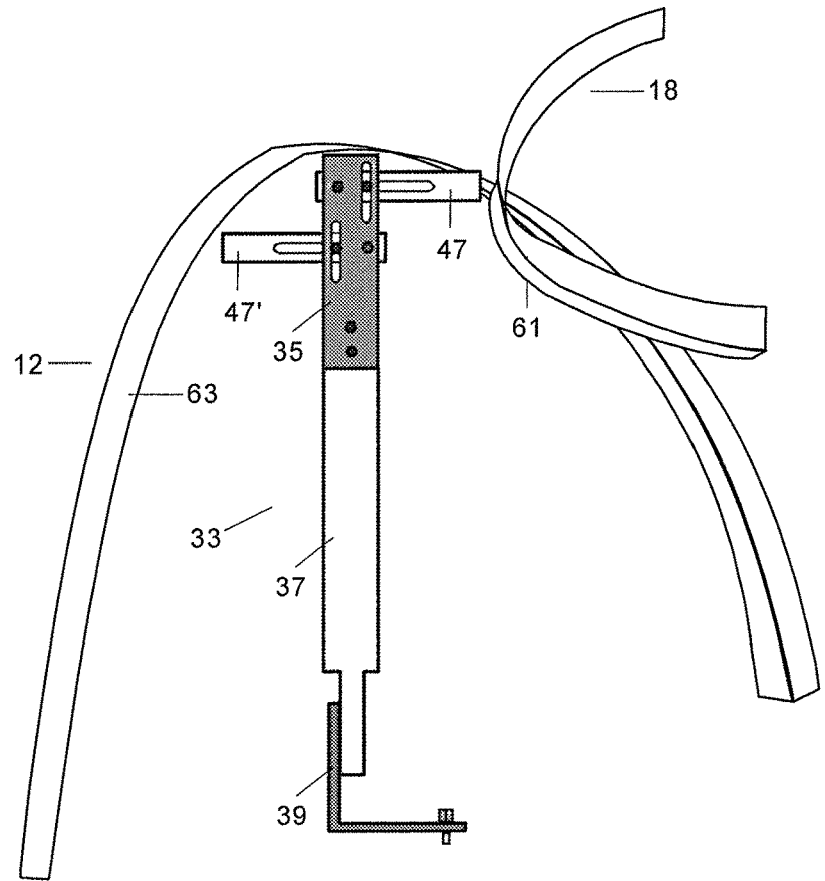
FIG. 6

LIGHTNING CURRENT TRANSMISSION SYSTEM FOR WIND TURBINES

FIELD OF THE INVENTION

This invention refers to lightning current transmission installed on a wind turbine and more particularly to a non-contact system.

BACKGROUND OF THE INVENTION

A conventional wind turbine (see FIG. 1) comprises three blades 10 connected to a blade bearing 19 to enable rotation around a longitudinal axis of the blade 10 (a rotation commonly known as "pitch"). The blade bearing 19 is connected to a main shaft 15 which carries the rotation movement of the rotor, to which the blades 10 are connected, to a gearbox which changes the angular rotation speed, and from there to an electrical generator.

In a conventional lightning protection system, a lightning current received by a blade is transmitted to earth by the following route (see FIGS. 1 and 2):

A lightning impact received at the tip of the blade is conveyed by first conduction means 25, 27; 25', 27' located inside the blade (the conduction means 27, 27' can be joined to a structural element 17 of the blade) to a metal band 18 located at the blade root at a certain distance from the blade bearing 19.

A flashover takes places from the metal band 18 to a lightning current transmission element 31 and another flashover takes place from the lightning current transmission element 31 to a metal ring 12 of the nacelle 13.

The lightning current follows second conduction means 28 situated inside the nacelle 13 without passing through any delicate parts of the wind turbine, such as the control cabinet of the rotor hub 21, the bearings of the main shaft, the gearbox or the generator, and reaches a yaw ring 20 of the wind turbine.

Finally, the lightning current is conveyed from the yaw ring 20 to earth through third conduction means 26 situated inside the tower 16.

The lightning current follows this route when the blade 10 is made of fibre glass or carbon fibre, materials which provide electrical insulation to prevent the lightning current passing from the blade 10 to the blade bearing 19.

ES 2 265 776 B1 describes a lightning protection system with a lightning current transmission element 31 comprising:

a first bar of a conductor material with a first and a second end opposite respectively to the metal band 18 and to the metal ring 12 at distances ensuring a flashover between them;

a second bar of an electrical insulation material capable of withstanding a temperature generated by a flashover for supporting the first bar and comprising joining means to the hub of the wind turbine.

The present invention is oriented to improve such system reducing, particularly, the breakdown voltage between their electrodes.

SUMMARY OF THE INVENTION

The invention provides a lightning current transmission system between the blades and the nacelle of a wind turbine comprising a metal band located at the root of each blade that receives lighting currents from one or more blade lightning current conductors located inside of each blade, a metal ring located at the nacelle that transmit lightning currents to one or more nacelle lightning current conductors to drive them to earth and a lightning current transmission element joined to the rotor hub for transmitting lightning currents from the metal band of each blade to the metal ring.

On the one side, the metal band of each blade and the metal ring are configured with protruding parts extended towards the lightning current transmission element (they can have an L-shaped configuration). On the other side the lightning current transmission element has a conductive portion with first and second receptors mounted on a base plate at different heights and oriented in a direction pointing, respectively, to the protruding parts of the metal band and the metal ring. The combination of both features allows a reduction of the breakdown voltage of the four electrodes of the system.

In an embodiment, the receptors of the lightning current transmission element are arranged at distances d1 and d2 of the protruding parts of the metal band and the metal ring comprised between, respectively, 2-10 mm and 5-35 mm. Other desirable features and advantages of the invention will become apparent from the subsequent detailed description and the appended claims, in relation with the enclosed drawings.

BRIEF DESCRIPTION OF THE DRAWINGS

FIG. 3 is a schematic lateral view of a lightning current transmission element illustrating an embodiment of the invention and FIGS. 4a and 4b are schematic plan views of the base plate and a receptor of its conductive portion.

FIGS. 5a and 5b are schematic lateral view of alternative configurations of the lightning current transmission element.

FIG. 6 is a schematic perspective view of a lightning current transmission system illustrating an embodiment of the invention.

DETAILED DESCRIPTION OF THE INVENTION

Figure 1:
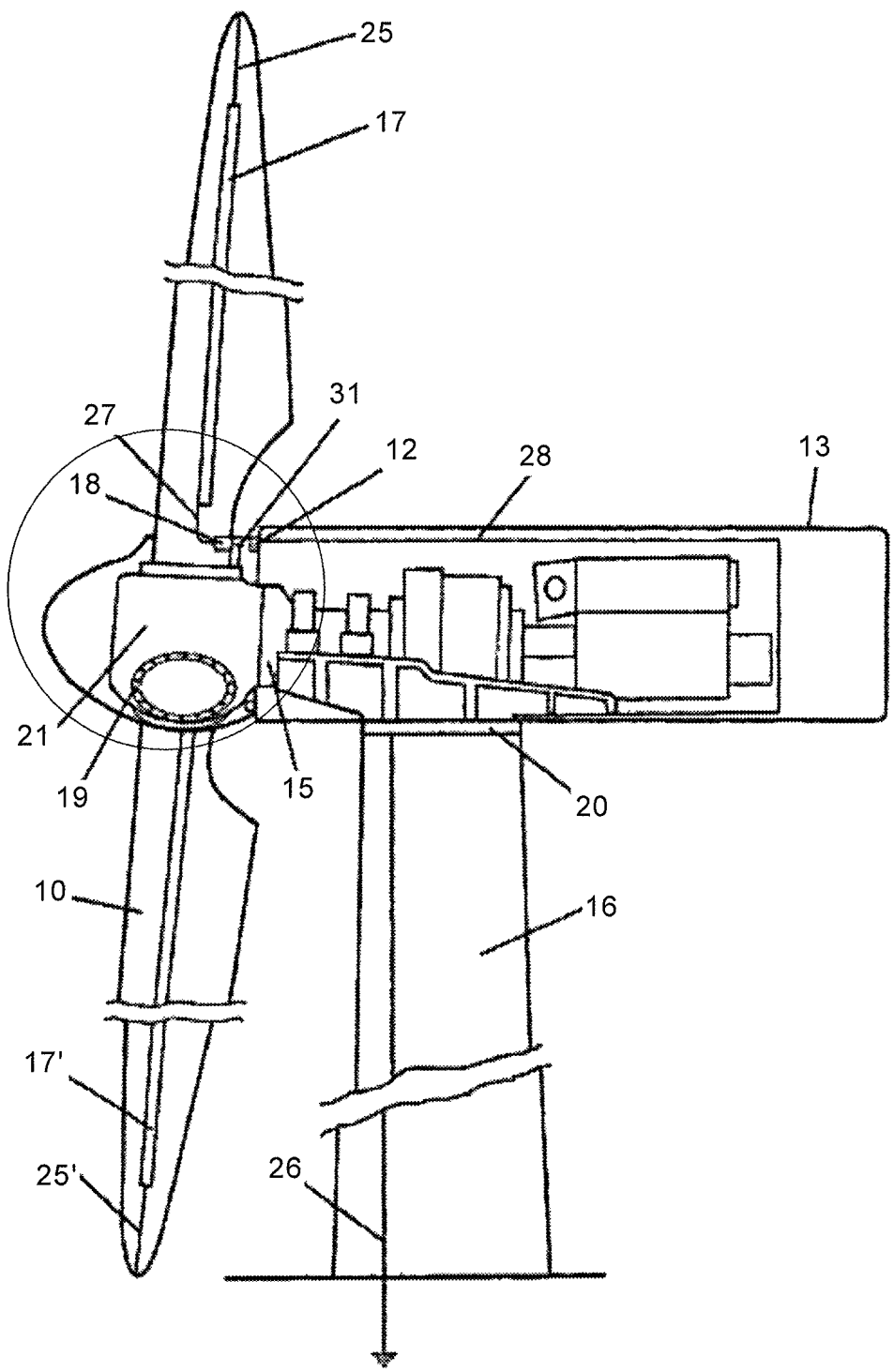
FIG. 1 is a schematic sectional lateral view of a wind turbine with a lightning current transmission system and FIG. 2 in an enlarged view of the circled area of FIG. 1.

In the embodiment illustrated in the Figures, the lightning current transmission system comprises:

A metal band 18 in each blade with a protruding part 61 (preferably with a planar configuration) extended towards the lightning current transmission element 33.

A metal ring 12 with a protruding part 63 (preferably with a planar configuration) extended towards the lightning current transmission element 33.

A lightning current transmission element 33 having a conductive portion 35, an insulating portion 37 and a supporting portion 39 through which is joined to the rotor hub.

The conductive portion 35 comprises a base plate 41 configured with two slotted holes 43, 43' located in its borders at different sides and heights and two circular holes 45, 45' located in front of the center of the slotted holes 43, 43' and two receptors 47, 47' configured with a slotted hole 49, 49'.

The receptors 47, 47' are joined to the base plate 41 by means of first fasteners 51 arranged on the circular holes 45, 45' of the base plate 41 and a cooperating slotted hole 49, 49' of the receptors 47, 47' and second fasteners 53 arranged on cooperating slotted holes 43, 43'; 49, 49' of, respectively the base plate 41 and the receptors 47, 47'.

That configuration allows that the receptors 47, 47' can be mounted at a different height in the base plate 41 and oriented in different directions to place them in a suitable location to cooperate with the protruding parts 61, 63 of the metal band 18 and the metal ring 12 for the lightning current transmission between them (see, particularly, FIGS. 5a and 5b).

The conductive portion 35 shall be made of a metallic material with a high fusion point such as copper, stainless steel or tungsten and have a minimum thickness of 6 mm by mechanical reasons and assuring a minimum cross-section of 50 mm$^2$.

The insulating portion 37 shall be made of a material such as nylon or other suitable plastic. In an embodiment it has a length of 200 mm.

The receptors 47, 47' can have a rectangular shape (with, for instance, a width of 20-40 mm and a thickness of 3-10 mm) with a minimum area of 100 mm2 and a minimum thickness of 3 mm.

The first receptor 47 shall be placed at a distance d1 of the protruding part 61 of the metal band 18 comprised between 2-10 mm and the second receptor 47' shall be placed at a distance d2 of the protruding part 63 of the metal ring 12 comprised between 5-35 mm to ensure the flashover.

In the embodiment illustrated in FIG. 6 the metal band 18 and the metal ring 12 have an L-shaped configuration being one of its branches the above-mentioned protruding parts 61, 63 in order to reduce the breakdown voltage in the four electrodes of the lightning current transmission system.

Figure 7A:
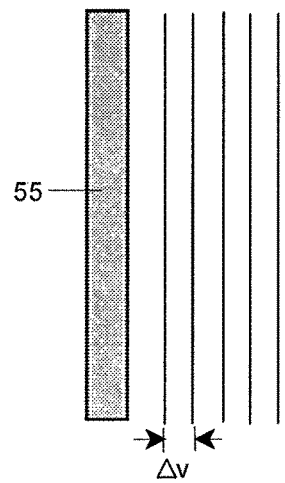
FIGS. 7a and 7b are schematic views of the equipotential lines along, respectively a flat electrode and an elongated electrode.
Figure 7B:
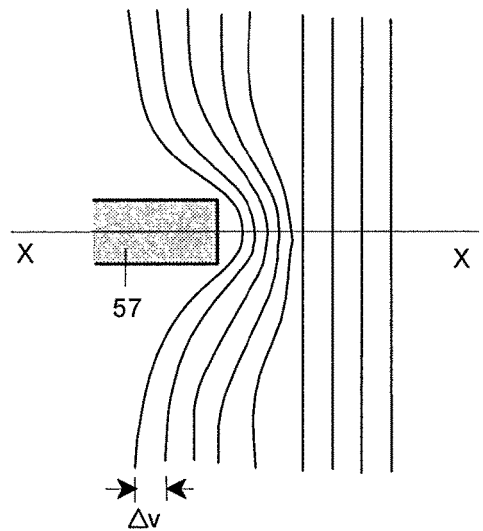

Near the electrodes, the distribution of the equipotential lines of the electric field depends on electrode geometry. If the electrode 55 is flat (see FIG. 7a) the distribution of the equipotential lines is uniform along the entire electrode (the spatial variation of the electric potential $\Delta V$ is constant) while if it the electrode 57 is elongated (see FIG. 7b) the spatial variation of the electric potential $\Delta V$ is reduced in the area close to the electrode. This makes that the electric field is amplified because $E=\Delta V/\Delta x$, being $\Delta x$ the variation of the distance in the X axis.

Figure 8A:
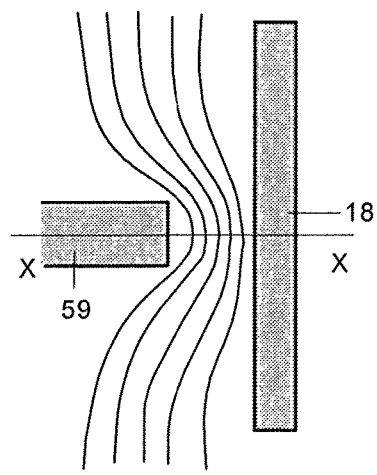
FIGS. 8a and 8b are schematic views of the electrical field in a gap of a lightning current transmission system in, respectively, a known system and in an embodiment of the invention.
Figure 8B:
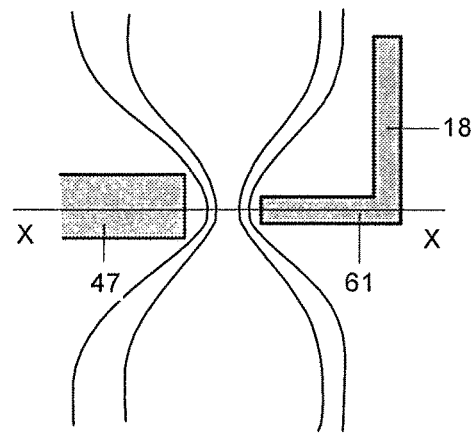

So, comparing the distribution of the equipotential lines of the electric field between an end 59 of the first bar and the metal band 18 in the lightning current transmission system described in ES 2 265 776 B1 (see FIG. 8a) and in the lightning current transmission system of the invention (see FIG. 8b) it can be observed that the electric field is amplified both in the receptor 47 and in the protruding part 61 of the metal band 18 (and similarly in the receptor 47' and in the protruding part 63 of the metal ring 12). Consequently the breakdown voltage is reduced. It is estimated that, keeping the same distances d1, d2 between electrodes, the breakdown voltage can be reduced between 15% and 50%.

Although the present invention has been described in connection with various embodiments, it will be appreciated from the specification that various combinations of elements, variations or improvements therein may be made, and are within the scope of the invention as defined by the appended claims.

The invention claimed is:

1. A lightning current transmission system between the blades (10) and a nacelle (13) of a wind turbine, comprising:
    a metal band (18) located at a root of each blade (10) that receives lightning currents from one or more blade lightning current conductors located inside of each blade (10);
    a metal ring (12) located at the nacelle (13) that transmits lightning currents to one or more lightning current conductors to drive the lightning currents to earth;
    a lightning current transmission element (33) for transmitting lightning currents from the metal band (18) of each blade (10) to the metal ring (12), comprising a conductive portion (35), an insulating portion (37), and supporting means (30) to be joined to a rotor hub (21);
    wherein:
    the metal band (18) of each blade (10) and the metal ring (12) are configured with protruding parts (61, 63) extended towards the lightning current transmission element (33);
    the conductive portion (35) of the lightning current transmission element (33) comprises first and second receptors (47, 47') mounted on a base plate (41) at different heights and oriented in a direction pointing, respectively, to the protruding parts (61, 63) of the metal band (18) and the metal ring (12);
    the base plate (41) comprises a pair of slotted holes (43, 43') disposed separately at different heights on the base plate (41) and a pair of circular holes (45, 45'), each circular hole of the pair of circular holes (45, 45') being disposed next to a center of each slotted hole of the pair of slotted holes (43, 43') of the base plate (41);
    each of the receptors (47, 47') comprises a slotted hole (49, 49'); and
    each of the receptors (47, 47') is mounted on the base plate (41) with a first fastener (51) positioned on each of the circular holes (45, 45') of the base plate (41) and on an end of each of the slotted holes (49, 49') of each of the receptors (47, 47'), and with a second fastener (53) positioned on each of the slotted holes (43, 43') of the base plate (41) and on each slotted hole of the slotted holes (49, 49') of the receptors (47, 47').

2. A lightning current transmission system according to claim 1, wherein the metal band (18), the metal ring (12), and the lightning current transmission element (33) are arranged with the first receptor (47) placed at a distance d1 of the protruding part (61) of the metal band (18) comprised between 2-10 mm and with the second receptor (47') placed at a distance d2 of the protruding part (63) of the metal ring (12) comprised between 5-35 mm.

3. A lightning current transmission system according to claim 1, wherein:
    the base plate (41) has a rectangular shape and a thickness of at least 8 mm;
    the receptors (47, 47') have a rectangular shape with an area of at least 100 mm$^2$ and a thickness of at least 3 mm.

4. A lightning current transmission system according to claim 1, wherein the metal band (18) of each blade (10) and the metal ring (12) have an L-shaped configuration being one its branches joined to, respectively, the root of a blade (10) or the nacelle (13) and being the other branch a protruding part (61, 63) extended towards the lightning current transmission element (33).

5. A lightning current transmission system according to claim 3, wherein the protruding parts (61, 63) of the metal band (18) of each blade (10) and the metal ring (12) have a planar configuration.

6. A wind turbine with a lightning current transmission system according to claim 1.

7. A lightning current transmission system according to claim 2, wherein the metal band (18) of each blade (10) and the metal ring (12) have an L-shaped configuration being one its branches joined to, respectively, the root of a blade (10) or the nacelle (13) and being the other branch a protruding part (61, 63) extended towards the lightning current transmission element (33).

8. A lightning current transmission system according to claim 3, wherein the metal band (18) of each blade (10) and the metal ring (12) have an L-shaped configuration being one its branches joined to, respectively, the root of a blade (10) or the nacelle (13) and being the other branch a protruding part (61, 63) extended towards the lightning current transmission element (33).

9. A wind turbine with a lightning current transmission system according to claim 2.

10. A wind turbine with a lightning current transmission system according to claim 3.

11. A wind turbine with a lightning current transmission system according to claim 4.

12. A wind turbine with a lightning current transmission system according to claim 5.

* * * * *